United States Patent [19]

Herger et al.

[11] Patent Number: 5,128,817
[45] Date of Patent: Jul. 7, 1992

[54] TAPE DRIVE AUTOLOADER APPARATUS FOR 8 MM MAGNETIC TAPE CARTRIDGES

[75] Inventors: Zoltan L. Herger; Vladimir Nejezchleb, both of Boulder, Colo.

[73] Assignee: Automated Cartridge Libraries, Inc., Longmont, Colo.

[21] Appl. No.: 570,111

[22] Filed: Aug. 17, 1990

[51] Int. Cl.$^5$ ............................................. G11B 15/60
[52] U.S. Cl. .................... 360/92; 414/790.5; 414/797.4
[58] Field of Search ............. 360/92; 414/790.5, 790.8, 414/797.4, 798, 788.8

[56] References Cited

U.S. PATENT DOCUMENTS

| | | | |
|---|---|---|---|
| 3,886,591 | 5/1975 | Bettini | 360/92 |
| 4,023,207 | 5/1977 | Cook | 360/92 |
| 4,072,991 | 2/1978 | Kok | 360/92 |
| 4,092,685 | 5/1978 | Sander et al. | 360/92 |
| 4,595,327 | 6/1986 | Woodley | 360/92 |
| 4,636,888 | 1/1987 | Sidebottom | 360/92 |
| 4,918,547 | 4/1990 | Kikuchi et al. | 360/92 |

Primary Examiner—Robert S. Tupper
Attorney, Agent, or Firm—William E. Hein

[57] ABSTRACT

An autoloading apparatus for alternately, sequentially loading magnetic tape cartridges into and unloading them from an adjacent magnetic tape drive includes a vertically oriented tape cartridge chute for containing a manually stacked plurality of tape cartridges to be subsequently sequentially loaded by gravity into the tape drive, an unload storage enclosure for storing a plurality of tape cartridges removed by the autoloading apparatus from the magnetic tape drive, a cartridge unloading mechanism responsive to opening of the cartridge door of the magnetic tape drive and having a hook and cartridge sleeve arrangement for engaging and holding a cartridge resident in the magnetic tape drive and for retractably moving that cartridge to a position where it is released by gravity into the unloading storage enclosure, and a cartridge loading mechanism operative in alternating sequence with the cartridge unloading mechanism for controlling a hinged slide at the bottom of the tape cartridge chute for releasing the bottom one of the stacked plurality of tape cartridges therein for entry by gravity into the open cartridge door of the magnetic tape drive, while retaining the remaining stacked plurality of tape cartridges in the tape cartridge chute, for then closing the hinged slide and releasing the remaining stacked plurality of tape cartridges against the closed hinged slide, and for finally closing the open cartridge door by urging a lever against it.

7 Claims, 4 Drawing Sheets

TAPE DRIVE AUTOLOADER APPARATUS FOR 8 MM MAGNETIC TAPE CARTRIDGES

BACKGROUND AND SUMMARY OF THE INVENTION

This invention relates generally to digital magnetic tape drives and more specifically to an apparatus for automatically loading 8 mm magnetic tape cartridges into and unloading them from such tape drives.

Digital magnetic tape drives are used extensively in today's computing systems. Magnetic tape cartridges have recently become popular as storage units for use with these digital magnetic tape drives. In particular, 8 mm magnetic tape cartridges are being widely used because they are economical, compact in size, and effectively protect the tape medium from contamination that would otherwise result from dust and handling. Due to their standardized dimensions, magnetic tape cartridges lend themselves to use in automatic loading/unloading mechanisms.

A number of loading/unloading machines are known in the prior art for handling various types of magnetic storage media. For example, Datapath Technologies, Inc. provides desktop autoloaders to handle floppy disk media. Archive Corporation, Wangdat, Wangtech, and others provide autoloaders for use with 4 mm DAT data cartridges. IBM, Storage Technology Corporation, Fujitsu, and Hitachi, for example, provide autoloaders to handle ½" IBM 3480 type tape cartridges. Advanced Digital Information Corporation provides the ADIC LANbacker 4000/8000 for use with tape cassettes.

Exemplary of prior art autoloaders that handle 8 mm tape cartridges is the EXB-10, manufactured by Exabyte Corporation. This autoloader, for example, employs an elaborate pinch mechanism for grabbing and holding the cartridges as they are being loaded into or unloaded from an associated magnetic tape drive, or as they are being transported to and from storage locations. As a result of the complex servo controls and mechanisms that they employ, these autoloaders are quite expensive. In addition, operation of these prior art tape cartridge autoloaders is generally controlled by software programs installed in a host computer by modification of existing software programs. These software programs are disadvantageous because they consume valuable computer memory space and are difficult to modify.

It is therefore the principal object of the present invention t provide an autoloader for tape cartridges that operates simply, yet reliably, to load cartridges into and unload cartridges from an associated magnetic tape drive without altering any software programs stored in the host computer.

In accordance with one aspect of the present invention, a sensor is provided that is responsive to opening of the tape drive door for initiating operation of the autoloader mechanism.

In accordance with another aspect of the present invention, a hook is provided for the engagement of a tape cartridge during an unloading operation. The unloading mechanism advances the hook to engage the tape cartridge at an opening provided for the release of spool brakes but without the deactivation of those spool brakes.

In accordance with another aspect of the present invention, a retractable sleeve is provided to fit around a tape cartridge. While the hook is advanced to engage the cartridge seated in the tape drive, the sleeve is retracted into a position at the front of the drive poised to surround the cartridge. The hook pulls the cartridge into the sleeve during extraction of the cartridge from the tape drive.

In accordance with another aspect of the present invention, a lever is provided to retract the sleeve during the release phase of the unloading operation and thereby disengage the cartridge from the hook.

In accordance with another aspect of the present invention, a platform is provided for accepting a cartridge after it has been released from the hook. The platform is suspended on a spring that allows the platform to descend under the weight of a cartridge distance approximately equal to the width of the cartridge.

In accordance with another aspect of the present invention, tape cartridges are stacked sequentially in a vertical chute as they await loading into the tape drive. The cartridges ar constrained by the dimensions of the chute for stacking in a slanted position. A trap door is provided at the bottom of the chute to contain the cartridges stacked therein and to release the bottom cartridge of the stack at such time as it is to be loaded into the tape drive.

In accordance with another aspect of the present invention, a sliding cam operates the trap door and a spring loaded lever, in a predetermined sequence, to suspend the stack of cartridges above the bottom cartridge and opening the trap door, thereby permitting the bottom cartridge to slide into the open cartridge door of the tape drive. The return movement of the sliding cam then closes the trap door and releases the stack of cartridges, allowing them to drop until the bottom cartridge rests on the trap door.

In accordance with another aspect of the present invention, a lever and rotating cam are provided for closing the cartridge door of the tape drive, thereby completing an autoload cycle and initiating the internal operation of the tape drive.

BRIEF DESCRIPTION OF THE DRAWINGS

FIGS. 2A and 2B show enlarged details from FIG. 2.

DETAILED DESCRIPTION OF THE INVENTION

Figure 1:
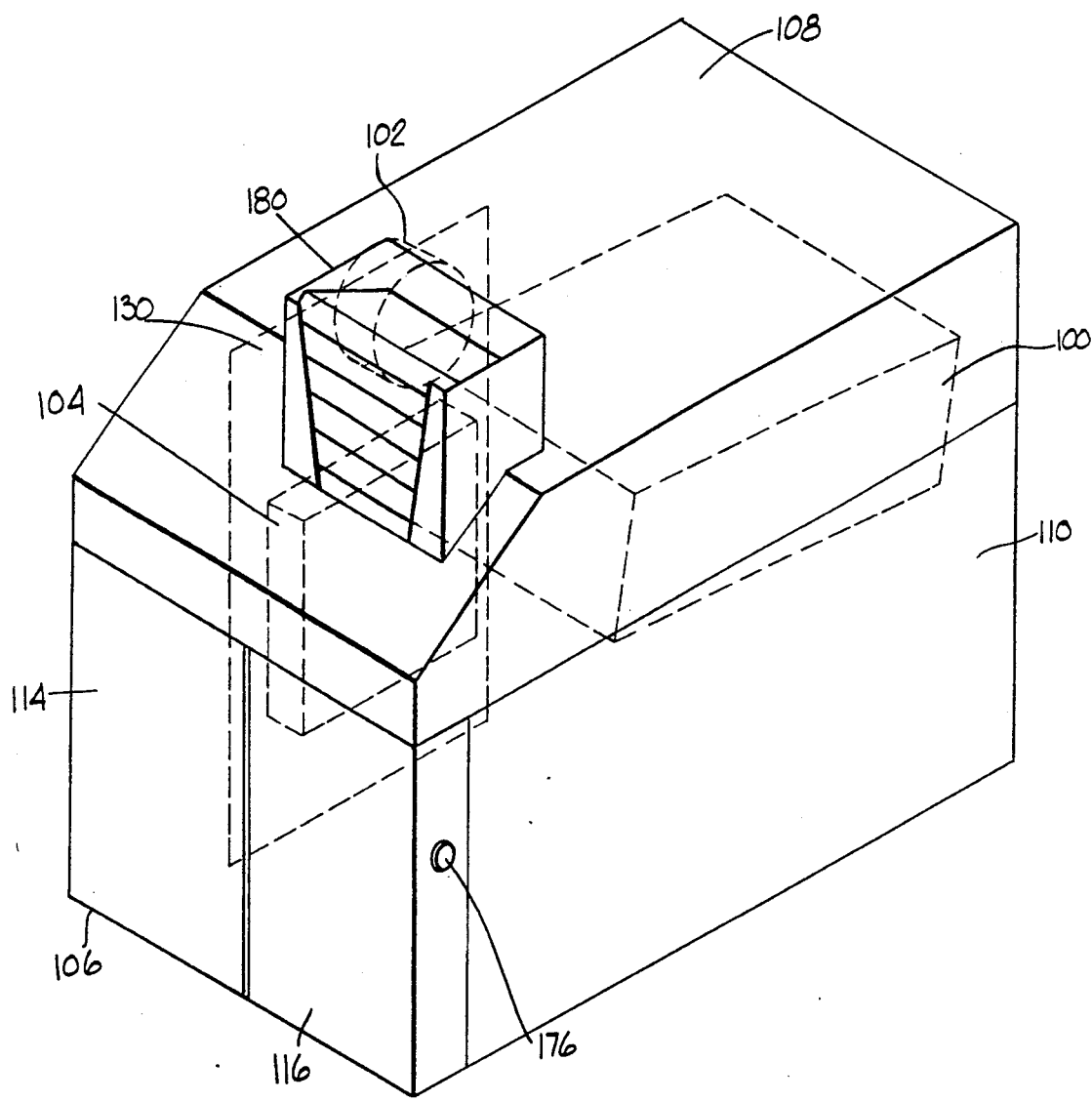
FIG. 1 is a simplified pictorial diagram of a tape cartridge autoloader in accordance with the present invention and of an associated conventional magnetic tape drive mounted within an enclosure of the tape cartridge autoloader.

Referring now to the simplified pictorial diagram of FIG. 1, there is shown a conventional 8 mm tape drive 100, a tape cartridge unloading mechanism 102, a tape cartridge loading mechanism 104, and an enclosure 106. The enclosure 106 includes a top cover 108, left and right side panels 112 and 110, a front indicator panel 114, and a cartridge access door 116 that may be locked to secure recorded cartridges against unauthorized removal.

Figure 2:
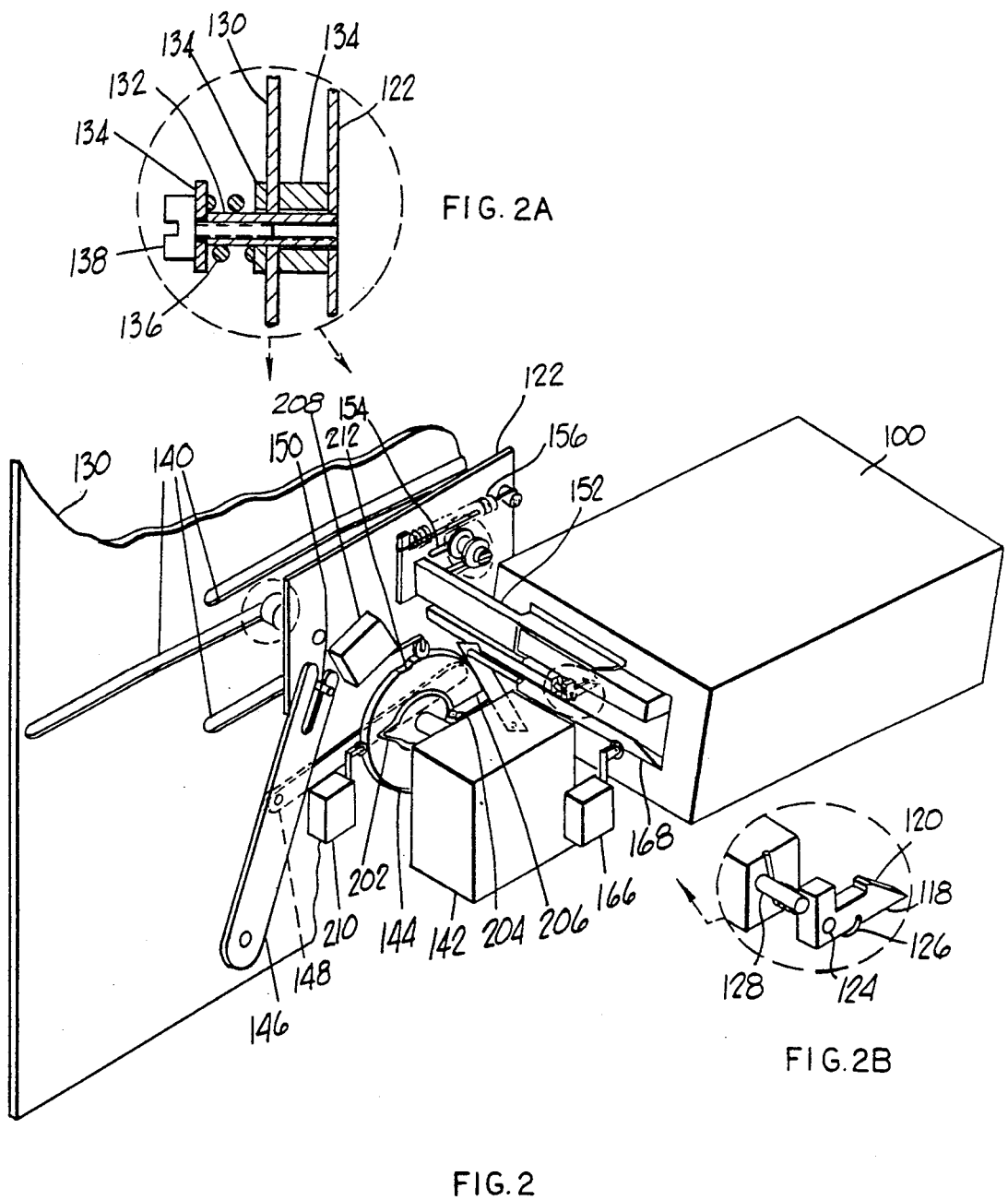
FIG. 2 is a detailed diagram illustrating the positions of the mechanical components of the tape cartridge autoloader of the present invention at the time a cartridge unloading operation is initiated.
Figure 3:
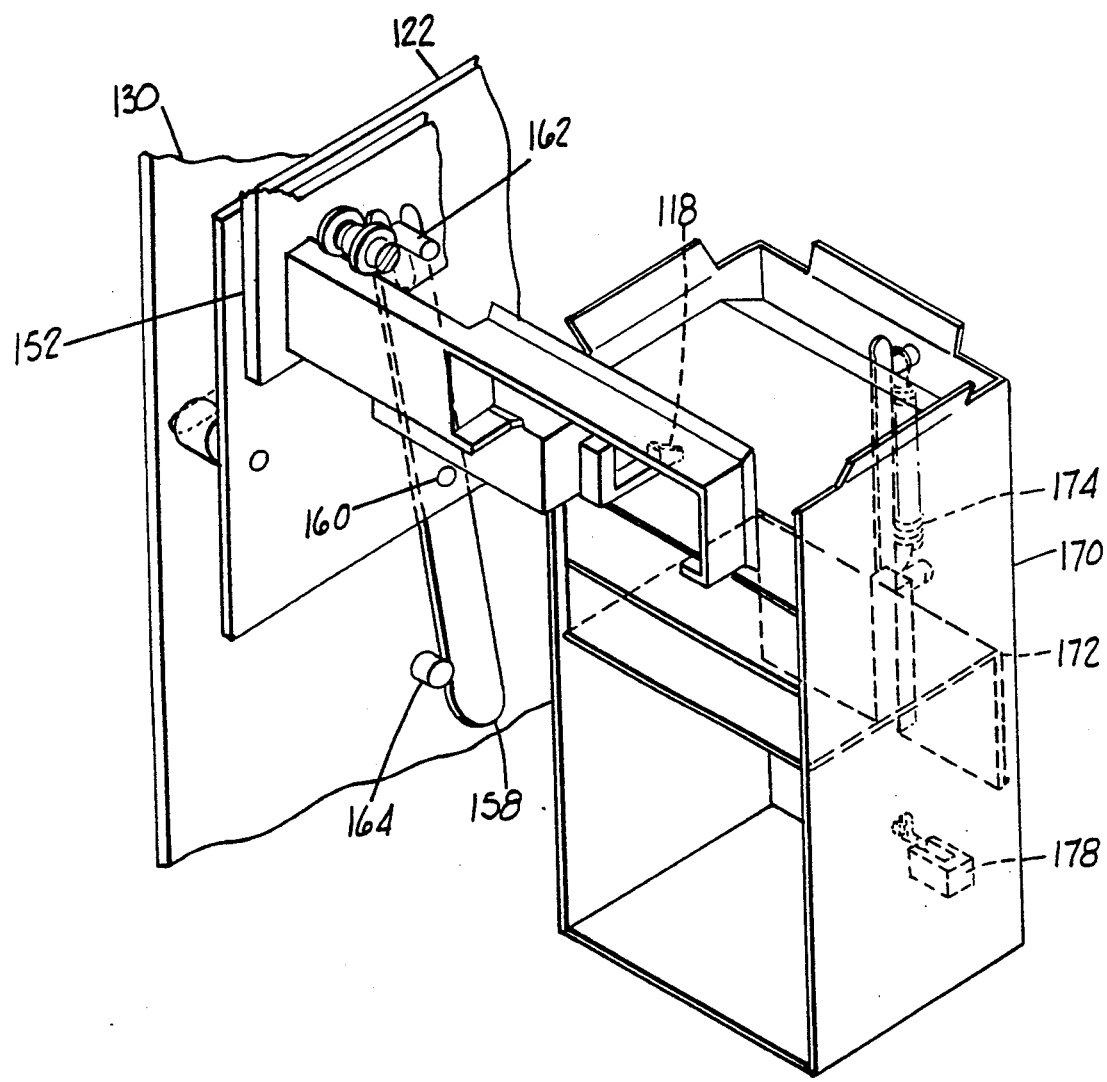
FIG. 3 is a detailed diagram illustrating the positions of the mechanical components of the tape cartridge autoloader of the present invention at the time a cartridge unloading operation is completed.

Referring now to the detailed diagrams of FIGS. 2 and 3, it may be seen that the tape cartridge unloading mechanism 102 includes a hook 118 having a rearwardly, upwardly slanting leading edge 120 to compensate for possible misalignments when approaching a cartridge to be unloaded from tape drive 100. Hook 118 is mounted on a sliding plate 122, inwardly spaced therefrom, and pivots about a pin 124. Hook 118 is placed under the load of a torsion spring 126 that forces hook 118 to rest against a stop 128.

Sliding plate 122 is mounted to a main plate 130 by three studs 132, plastic spacers 134, compression springs 136, and screws 138. The studs 132 are positioned in suitably formed slots 140 of the main plate 130, under controlled friction created by the springs 136 and spacers 134, thereby allowing the sliding plate 122 to move forward and backward between the ends of slots 140 and to follow the path defined thereby.

An electric motor 142 drives a crank 144 that, in turn, moves a lever 146 via a connecting link 148. A pin 150 is captively held in the slotted upper end of lever 146, by which lever 146 moves the sliding plate 122.

A cartridge sleeve 152 is mounted to the sliding plate 122 by three studs 132, spacers 134, springs 136, and screws 138, allowing sleeve 152 to move backward and forward within the slots 154 of sliding plate 122 in a manner similar to that described above in connection with motion of sliding plate 122 with respect to main plate 130. A spring 156 is attached to both sliding plate 122 and sleeve 152, biasing sleeve 152 away from hook 118.

A lever 158 is also mounted to sliding plate 122 and pivots about its mounting point 160. An upper slotted end of lever 158 is captively held by pin 162, which is an integral part of the base of cartridge sleeve 152. The lower end of lever 158 is forced against a stop 164 when sliding plate 122 moves forward, thereby causing cartridge sleeve 152 to retract toward hook 118, as illustrated in FIG. 3.

During an unloading operation, tape cartridges are dropped into an unload storage enclosure 170 under the force of gravity and are sequentially stacked on a platform 172. The platform 172 is suspended by an extension spring 174, allowing the stacked cartridges to move down approximately one cartridge thickness under the weight of one cartridge. The cartridge access door 168 is suitably hinged on unload storage enclosure 170. A key operated lock 176 is provided for data security purposes. A sensor 178 prevents the autoloader of the present invention from unloading cartridges in excess of the capacity of the unload storage enclosure 170.

The loading mechanism 104 of FIG. 1 includes a vertical chute 180, into which a number of tape cartridges are manually stacked in preparation for sequential loading into tape drive 100. As illustrated in the detailed diagram of FIG. 4, a trap door 182 is attached to the bottom of chute 180 at side pivot points 184. An arm extension 186 of trap door 182 serves to open (lower) and close (lift) trap door 182. The opening and closing of trap door 182 is accomplished by the motion of a sliding cam plate 188, which is driven by an electric motor 190 via a crank 192 that is attached to cam plate 188 through a link 194.

Cam plate 188 also operates lever 196 against the torque transmitted to it by a torsion spring 198. Lever 196 i mounted to chute 180 at its pivot point 200. One end of lever 196 rides in a camway in cam plate 188, while the other end exerts pressure o the side of the second cartridge from the bottom of the stack of tape cartridges contained in chute 180 when the camway in cam plate 188 is moved into a position allowing spring 198 to transmit full torque to lever 196, thereby biasing the second cartridge from the bottom of the stack against the opposite side of chute 180.

Referring again to FIG. 2, it may be seen that a rotating cam 202 is an integral feature of crank 144. A cam follower 204 is rigidly attached to a lever 206, causing it to move in accordance with the motion prescribed by the camway of cam 202. The upper end of lever 206 is in contact with cartridge door 168 of tape drive 100.

Figure 4:
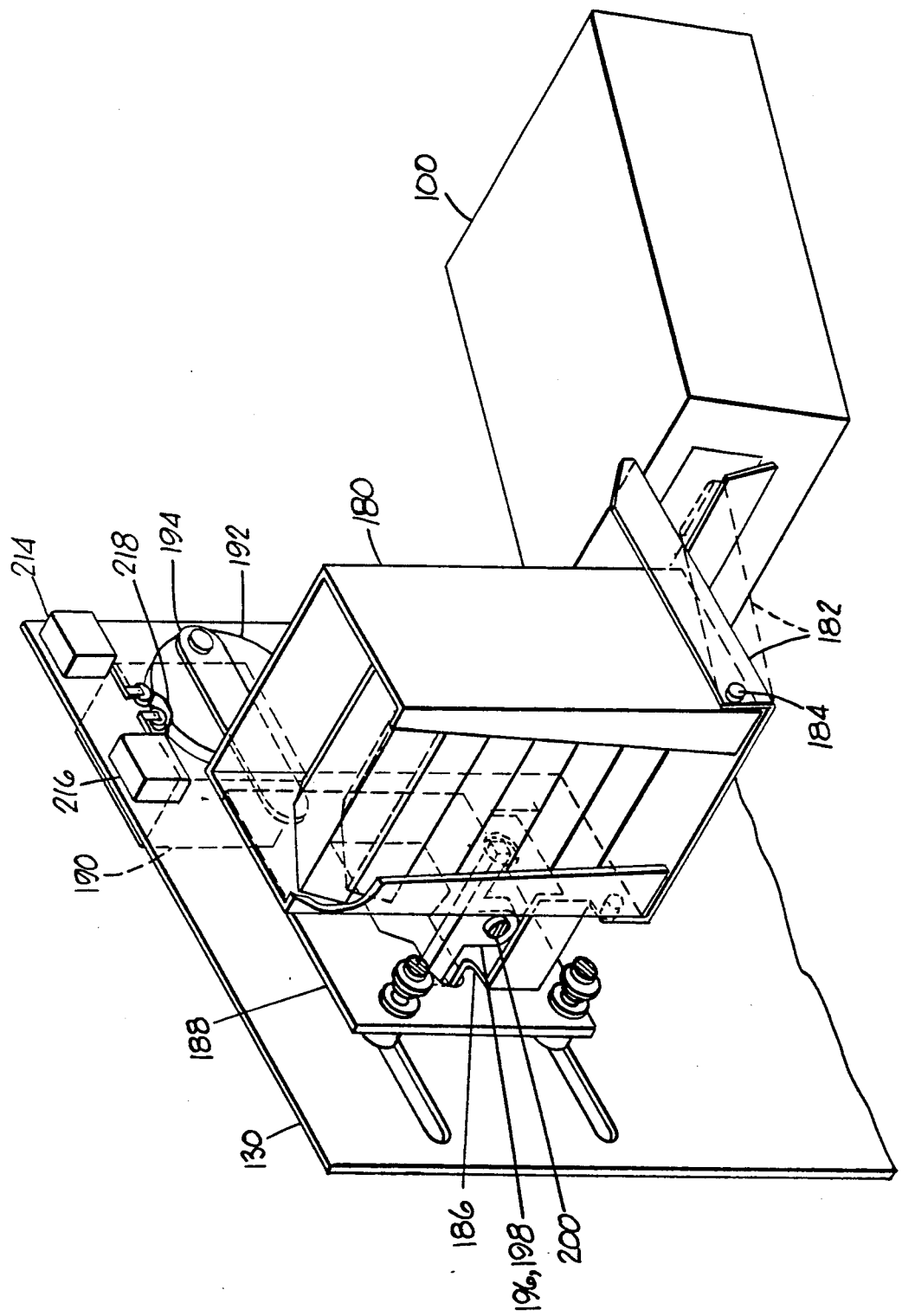
FIG. 4 is a detailed diagram illustrating the cartridge chute, a stack of cartridges contained therein, and the way in which a trap door at the bottom of the cartridge chute opens to permit the bottom cartridge of the stack to slide by gravity into the open cartridge door of the associated magnetic tape drive.

A pair of micro switches 208 and 210 are mounted such that their roller arms roll on the periphery of rotating cam 202. An indentation 212 on the outside diameter of cam 202 actuates switches 208 and 210 to thereby time the sequence of electric motors 142 and 190. Another pair of micro switches 214 and 216, illustrated in FIG. 4, are mounted about crank 192 and serve similar timing purposes. Their switching actions are governed by indentations 218 on the outside diameter of crank 192.

Referring now to FIGS. 2 and 3, an unloading operation of the autoloader of the present invention begins at such time as cartridge door 168 of conventional tape drive 100 opens following a aread or write operation and subsequent rewinding of a tape cartridge within tape drive 100. The opening of cartridge door 168, which is conventionally initiated within tape drive 100 or the host computer to which it is connected, is sensed by micro switch sensor 166. Micro switch sensor 166 initiates operation of motor 142 to rotate crank 144 from its home position, thereby moving lever 146 toward tape drive 100 via connecting link 148. The driving force exerted on pin 150 by the lever 146 also moves sliding plate 122 toward tape drive 100, following the path predetermined by slots 140 on the main plate 130. The three studs 132 serve to guide the sliding plate 122 to insure that it will follow the path of slots 140 in a motion parallel to its home position. Compression springs 136 and spacers 134 provide elastic pressure along the axis of each of studs 132 to fix the space between main plate 130 and sliding plate 122 and, in addition, to guarantee approximately constant friction regardless of slight variations in the thickness of main plate 130.

Cartridge sleeve 152 moves forward in concert with sliding plate 122 until it reaches the exposed front plate of tape drive 100, which prevents cartridge sleeve 152 from continuing its forward motion. Sliding plate 122, however, is not prevented from moving to its extreme forward position as represented by of the stroke of lever 146. Therefore, a relative sliding motion occurs between sliding plate 122 and sleeve 152, which allows hook 118 to engage the underside of the tape cartridge positioned in tape drive 100, while cartridge sleeve 152 is forced against the front plate of tape drive 100 by extension spring 156, permitting cartridge sleeve 152 to surround the tape cartridge.

Lever 146 begins moving sliding plate 122 away from tape drive 100 after reaching the extreme rearward position of its permitted travel. Hook 118 acts to pull the engaged cartridge out of tape drive 100. Cartridge sleeve 152 resumes its home position on sliding plate 122 due to the force exerted on it by spring 156, thereby causing the tape cartridge to be positioned and supported within the confines of cartridge sleeve 152, engaged by hook 118.

Lever 146 continues to move sliding plate 122 away from tape drive 100 toward the extreme forward position of its permitted travel, as illustrated in FIG. 3. The lower end of lever 158 is forced against stop 164 by the continued forward motion of sliding plate 122, causing sleeve 152 to retract toward hook 118. When cartridge sleeve 152 is fully retracted, it is positioned adjacent the front portion of hook 118, no longer holding the cartridge captive and resulting in the cartridge falling off hook 118. At this point in time, the cartridge is positioned such that it falls directly onto platform 172 within unload storage enclosure 170 or on top of a previously unloaded stack of cartridges lying on platform 172. The platform 172 is suspended within unload storage enclosure 170 by extension spring 174, thereby allowing the stacked cartridges to move down approximately one cartridge thickness as each additional cartridge is unloaded thereon.

While lever 146 approaches the extreme forward position of its permitted travel, the indentation 212 on the periphery of cam 202 actuates micro switch 208 to turn on electric motor 190 to begin a cartridge loading operation.

As a cartridge loading operation begins, crank 192, being rigidly mounted to the shaft of motor 190, follows its rotation in a clockwise direction, as illustrated in FIG. 4. Micro switch 214 turns off motor 142 when indentation 218 lifts the roller arm of micro switch 214. Crank 192 moves cam plate 188 away from its home position, which is also the position closest to motor 190. Cam plate 188 provides one cam action for releasing and retracting lever 196 and another cam action for lifting and lowering trap door 182. The two cam actions have a definite timing relationship.

Lever 196 is released first by the motion of cam plate 188, exerting pressure on the side of the second cartridge from the bottom of the stack of cartridges contained in vertical chute 180. The pressure so exerted places a physical bias on the cartridge and creates a frictional force between that second cartridge from the bottom of the stack and the opposite side of the vertical chute 180. The friction created effectively holds the second from the bottom cartridge and all other cartridges stacked above it, preventing them from sliding downward within chute 180. As a result, the bottom cartridge is free of the weight of the remaining cartridges above it and is thus permitted to exit the chute 180 when trap door 182 opens. The exiting bottom cartridge slides along the top surface of trap door 182 into the open cartridge door 168 of tape drive 100.

The portion of the cartridge loading operation described immediately above is now repeated in the reverse sequence when the cam plate 188 is moved back to its home position. First, trap door 182 is lifted by the cam action of cam plate 188 while the stack of cartridges is still supported by the pressure of lever 196. Next, lever 196 is retracted, releasing the stack of cartridges so that they are permitted to move downward to occupy the space vacated by the bottom cartridge previously loaded into tape drive 100.

The continuous rotation of crank 192 advances indentation 218 to actuate micro switch 214, immediately following the lifting of trap door 182, thereby restarting motor 142. When cam plate 188 is returned to its home position, indentation 218 trips micro switch 216, thereby turning off motor 190.

The restarting of motor 142 advances rotating cam 202, in turn rotating lever 206 by its cam follower 204 so as to close cartridge door 168 of tape drive 100. Further rotation of cam 202 allows lever 206 and sliding plate 122 to return to their respective home positions. At that point in time, indentation 212 actuates micro switch 210, turning off motor 142 and bringing all mechanisms to a halt. This terminates a complete load/unload cycle of the tape cartridge autoloader of the present invention.

We claim:

1. An autoloading apparatus for alternately, sequentially loading magnetic tape cartridges into and unloading them from an adjacently positioned magnetic tape drive, the autoloading apparatus comprising:

vertically oriented tape cartridge chute means for containing a manually stacked plurality of tape cartridges to be subsequently, sequentially loaded into said magnetic tape drive, said tape cartridge chute means having a hinged slide at the bottom thereof for retaining said stacked plurality of tape cartridges therein when said hinged slide is in a closed position and for permitting a bottom one of said stacked plurality of tape cartridges to exit said chute means by gravity into an open cartridge door of said magnetic tape drive when said hinged slide is in an open position;

unload storage enclosure means for storing a plurality of tape cartridges removed by the autoloading apparatus from said magnetic tape drive, said unload storage enclosure means including platform means for receiving, in stacked arrangement, the plurality of tape cartridges removed from said magnetic tape drive;

a cartridge unloading mechanism comprising sensing means for sensing the opening of said cartridge door of said magnetic tape drive, hook means adapted for motion toward said cartridge door and for engaging a tape cartridge resident in said magnetic tape drive, said hook means being adapted for retracting said tape cartridge from said magnetic tape drive following engagement therewith, said cartridge unloading mechanism further comprising cartridge sleeve means for receiving said tape cartridge as it is being retracted from said magnetic tape drive by said hook means, said cartridge unloading mechanism further comprising cartridge release means operative for moving said cartridge sleeve means into a position proximate said unload storage enclosure means, for disengaging the retracted tape cartridge from said hook means, and for gravitationally releasing the retracted tape cartridge onto said platform means of said unload storage enclosure means; and a cartridge loading mechanism operative in alternating sequence with said cartridge unloading mechanism and cooperatively coupled to said tape cartridge chute means, said cartridge loading mechanism comprising hinged slide control means for controllably opening and closing said hinged slide, said hinged slide control means further comprising stop means arranged for engagement, when said hinged slide is in its open position, thereby preventing downward motion of all but said bottom one of said stacked plurality of tape cartridges contained in said chute means, said stop means being further arranged for disengagement, following the exit by gravity of said bottom one of said stacked plurality of tape cartridges contained in said chute means when said hinged slide is in its open position and the subsequent movement of said hinged slide to its closed position, for releasing the remaining stacked plurality of tape cartridges against said hinged slide in its closed position, said cartridge loading mechanism further comprising cartridge door closing means operative, following the exit by gravity of said bottom one of said stacked plurality of tape cartridges contained is said chute means into said open cartridge door of said magnetic tape drive, for closing said cartridge door.

2. An autoloading apparatus as in claim 1, further comprising cabinet means enclosing said unload storage enclosure means said cartridge unloading mechanism, and said cartridge loading mechanism, said cabinet means including locking access means for preventing unauthorized access to said plurality of tape cartridges stored in said unload storage enclosure means.

3. An autoloading apparatus as in claim 1 wherein said cartridge door closing means comprises a lever that is urged against said cartridge door.

4. An autoloading apparatus as in claim 1, futher comprising:
   first motor and cam means for driving said cartridge unloading mechanism; and
   second motor and cam means for driving said cartridge loading mechanism.

5. An autoloading apparatus as in claim 1 wherein said platform means of said unload storage enclosure means is adapted for vertical, spring-loaded motion such that said platform means moves downward a distance approximately equal to a thickness of a tape cartridge each time a tape cartridge is unloaded thereon.

6. An autoloading apparatus as in claim 1 wherein said tape cartridge chute means is adapted for containing said stacked plurality of tape cartridges in a downwardly slanting position such that a tape access edge of each of said plurality of tape cartridges is at a lower position than an opposite edge of each of said plurality of tape cartridges.

7. An autoloading apparatus as in claim 4 wherein:
   motion of said hook means and cartridge sleeve means is controlled by said first motor and cam means and by a first plurality of slots in a vertical plate coupled to said hook means and said cartridge sleeve means; and
   said hinged slide control means is controlled by said second motor and cam means and by a second plurality of slots in said vertical plate.

* * * * *